(No Model.)

H. J. BREWER.
GALVANIC BATTERY.

No. 592,760. Patented Nov. 2, 1897.

2 Sheets—Sheet 1.

WITNESSES:
Wm. A. Pollock
Jac. Klemann Jr.

INVENTOR
Horatio J. Brewer

BY
E. N. Dickerson
HIS ATTORNEY

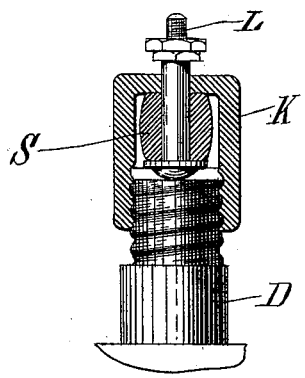
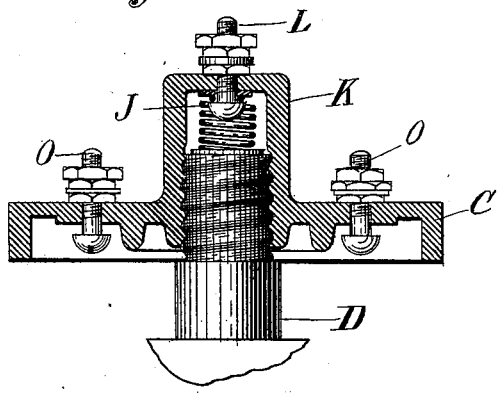

UNITED STATES PATENT OFFICE.

HORATIO J. BREWER, OF NEW YORK, N. Y.

GALVANIC BATTERY.

SPECIFICATION forming part of Letters Patent No. 592,760, dated November 2, 1897.

Application filed April 15, 1893. Serial No. 470,532. (No model.)

*To all whom it may concern:*

Be it known that I, HORATIO J. BREWER, of the city, county, and State of New York, have invented a new and useful Improvement in Galvanic Batteries, of which the following is a full, true, and exact description, reference being had to the accompanying drawings.

This invention relates to an improvement in galvanic batteries and is applied to a cell having a positive element of zinc and a negative element of carbon and an electrolyte consisting of a solution of sal-ammoniac. The arrangements, however, are in part applicable to other forms of battery.

Figure 1:
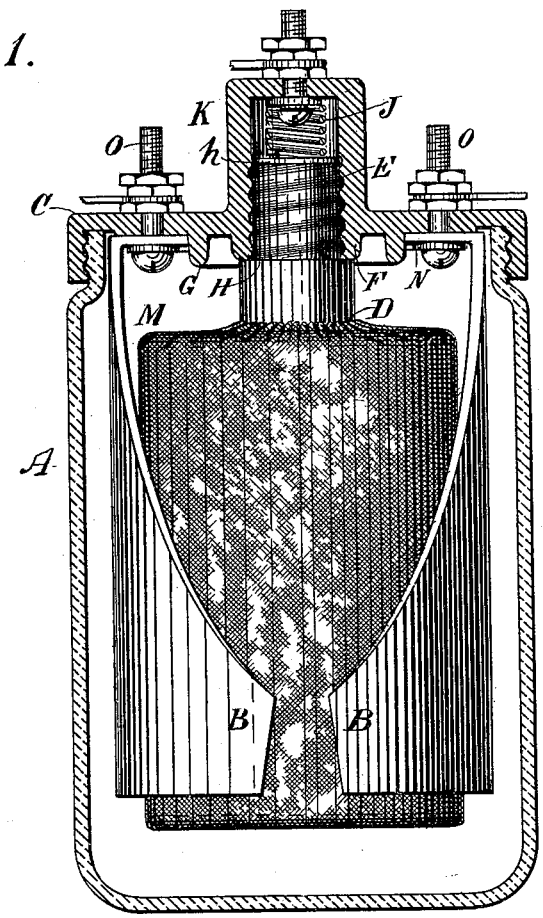
Figure 2:
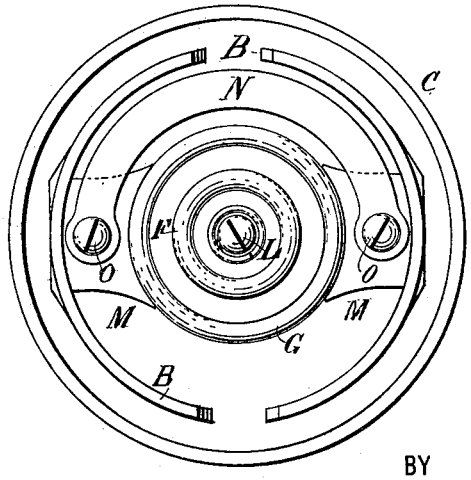

In my drawings, Figure 1 represents a vertical cross-section, partly in perspective, of my battery; and Fig. 2, a plan view of the bottom of the cover, showing the zincs, but the carbon removed. Figs. 3 and 4 represent cross-sections of modifications of my method of connecting with the carbon element which may be used independently of the entire construction of Fig. 1.

A represents a cell of any suitable construction having its upper ends screw-threaded, as shown. Usually I make the cell of glass.

C represents the cover, suitably screw-threaded to engage with the cell, itself adapted to support the battery elements. This cover is made of suitable insulating material—as, for instance, hard rubber. It supports, as shown, two semicylindrical zincs B B, surrounding a central carbon pole D, which may be of any suitable construction, and, as shown, it consists of a wing-carbon surrounded by a bag containing the electronegative material.

The most important features of my invention are, first, the method of making the connection with the negative element; second, the arrangement and shape of the zincs; third, the method of supporting the elements from the cover.

In Fig. 4, S represents a spring, preferably of rubber, bearing against the end of the screw L, accomplishing the same results as is shown in Fig. 3. It is, indeed, possible in some cases to dispense altogether with the spring, but I much prefer its use.

Fig. 3 shows a modification of my invention in which the cup is formed integral with the cover. The cover itself has a vertical central screw-threaded opening E, in which the screw-threaded carbon is supported. The cover has a downwardly-projecting flange F and another concentric therewith at G. The central carbon pole is provided with a shoulder H, which when in position engages with the annular shoulder F. This prevents the passage of deleterious substances from the battery to the upper connection of the carbon.

The upwardly-projecting cup K forms the upper bearing of a spring J, the lower bearing of which is upon the upper end of the carbon pole, the plate $h$, of comparatively non-oxidizable material, being interposed. The upper end of the spring J is carried on the screw-head L, the upper end of which serves for the wire attachment by suitable nuts and washers. The second shoulder or flange G serves to retain the zincs B B in position. As shown, these zincs are generally semicylindrical, having their upper portions cut away, for I have discovered that in this form of battery the greatest electrical work, and consequently destruction of zinc, occurs at the bottom. The upper part of the zincs is bent, as shown at M, having a circular portion engaging with a flange G, which prevents rotation and therefore contact of the zincs with the carbon. The zincs are connected by a removable connector N, carried upon the screws O O, which serve to support the zincs. By removing this connector N one of the zincs can be thrown out of connection and a double circuit may be utilized from each zinc back to the carbon. The cover may be provided with a suitable opening for the escape of gas, if desired.

What I claim as my invention, and desire to secure by Letters Patent, is—

1. The combination of a battery-cover having a cup formed thereon, with a battery element passing into said cup and supported therein, and an elastic connection interposed between the head of the cup and the battery element, substantially as described.

2. The combination of the cover C, the cup K formed thereon and screw-threaded within, the carbon element D, and the spring J interposed between said cup and carbon element, substantially as described.

3. The combination of the cup K formed thereon and screw-threaded within, the cover C, the carbon element D, the metallic conductor $h$, and the spring J between said cup and conductor, substantially as described.

4. The combination of the zincs B, B, provided with flanges M, M, and the battery-cover C, provided with the flange G on its under side engaging with said flanges M, M, to prevent rotation of the zincs, substantially as stated.

5. A zinc for galvanic batteries, composed of two similar parts provided with a connector and with flanges for securing same to the battery-cover, and formed with the greatest body of metal at the bottom and edges tapering toward the top, for presenting the maximum metal surface at the point of greatest corrosion, substantially as described.

6. The combination of a carbon battery element having a screw-thread formed thereon integral therewith, a battery connection or cup screwed upon said carbon, a threaded aperture in said cup containing a screw L, a cap $h$ upon said carbon, and a spring interposed between the screw and said cap, substantially as described.

In testimony whereof I have signed my name to this specification in the presence of two subscribing witnesses.

HORATIO J. BREWER.

Witnesses:
WILLIAM M. ILIFF,
WM. A. POLLOCK.